US010929601B1

(12) United States Patent
Trafny et al.

(10) Patent No.: US 10,929,601 B1
(45) Date of Patent: Feb. 23, 2021

(54) QUESTION ANSWERING FOR A MULTI-MODAL SYSTEM

(71) Applicant: Amazon Technologies, Inc., Seattle, WA (US)

(72) Inventors: Zachary Phillip Trafny, Santa Barbara, CA (US); Christopher E. Balmes, San Francisco, CA (US); Alex D. Wilson, Santa Barbara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 190 days.

(21) Appl. No.: 15/934,028

(22) Filed: Mar. 23, 2018

(51) Int. Cl.
*G06F 40/242* (2020.01)
*G06N 5/04* (2006.01)
*G10L 15/08* (2006.01)
*G06F 40/295* (2020.01)

(52) U.S. Cl.
CPC .......... *G06F 40/242* (2020.01); *G06F 40/295* (2020.01); *G06N 5/04* (2013.01); *G10L 15/08* (2013.01); *G10L 2015/088* (2013.01)

(58) Field of Classification Search
CPC .............. G06F 17/2735; G06F 17/278; G06F 16/3329; G06F 3/167; G06N 5/04; G06N 20/00; G06N 5/02; G10L 15/08; G10L 15/193; G10L 15/22
See application file for complete search history.

(56) References Cited

U.S. PATENT DOCUMENTS

| | | | | |
|---|---|---|---|---|
| 5,774,860 A * | 6/1998 | Bayya | ..................... | G10L 15/22 700/246 |
| 9,135,561 B2 * | 9/2015 | Vadlamani | ............. | G06N 5/022 |
| 9,495,962 B2 * | 11/2016 | Govrin | ................... | G06Q 40/02 |
| 10,331,402 B1 * | 6/2019 | Spector | ................... | G06F 3/167 |
| 2014/0040748 A1 * | 2/2014 | Lemay | ................... | G06F 3/167 715/728 |
| 2014/0222436 A1 * | 8/2014 | Binder | ................. | G10L 15/265 704/275 |
| 2014/0365885 A1 * | 12/2014 | Carson | ................... | G06F 3/167 715/708 |
| 2015/0066479 A1 * | 3/2015 | Pasupalak | ........... | G06F 16/9535 704/9 |
| 2015/0193379 A1 * | 7/2015 | Mehta | .................... | G10L 15/00 704/9 |

(Continued)

*Primary Examiner* — Mohammad K Islam
(74) *Attorney, Agent, or Firm* — Pierce Atwood LLP

(57) ABSTRACT

Techniques for determining an answer that relates to a user question when a system is unable to determine an exact answer to the user question are described. When the system receives a user question, the system may parse the user question to determine the words making up the question. The system may then process the words against an indexed dictionary of words to piece the words of the question together to from interpretations of the different possible relationships that may exist between the words. The system may attempt to determine an exact answer to the user question using the indexed words. If the system determines an exact answer, the system may output the answer to the querying user. If the system is unable to determine an exact answer, the system may navigate through a ontology of relationships within a knowledge base to determine an answer that is related to the user question but that may not directly answer the user question.

18 Claims, 9 Drawing Sheets

(56) References Cited

U.S. PATENT DOCUMENTS

| | | | |
|---|---|---|---|
| 2016/0110071 A1* | 4/2016 | Brown | G06F 3/165 |
| | | | 715/758 |
| 2016/0188565 A1* | 6/2016 | Robichaud | G06F 16/3325 |
| | | | 704/9 |
| 2016/0253434 A1* | 9/2016 | Yu | G06F 17/2785 |
| | | | 707/760 |
| 2017/0162197 A1* | 6/2017 | Cohen | G06F 3/012 |
| 2018/0018959 A1* | 1/2018 | Des Jardins | G10L 15/005 |
| 2018/0068031 A1* | 3/2018 | Hewavitharana | G06N 3/006 |
| 2018/0143967 A1* | 5/2018 | Anbazhagan | G06F 8/30 |
| 2018/0144046 A1* | 5/2018 | Braga | G06F 16/3329 |
| 2018/0165596 A1* | 6/2018 | Abrams | G06N 20/00 |
| 2018/0190272 A1* | 7/2018 | Georges | G10L 15/22 |
| 2018/0261203 A1* | 9/2018 | Zoller | G10L 13/027 |
| 2019/0027147 A1* | 1/2019 | Diamant | G06F 16/58 |
| 2019/0057693 A1* | 2/2019 | Fry | G10L 15/22 |
| 2019/0065498 A1* | 2/2019 | Yuan | G06F 16/24522 |
| 2019/0065556 A1* | 2/2019 | Kumar | G06F 9/451 |
| 2019/0130286 A1* | 5/2019 | Salameh | G06N 5/022 |
| 2019/0156222 A1* | 5/2019 | Emma | G10L 15/22 |
| 2019/0236464 A1* | 8/2019 | Feinson | G06F 17/27 |
| 2019/0237068 A1* | 8/2019 | Canim | G06F 16/337 |
| 2019/0279627 A1* | 9/2019 | Wang | G10L 15/22 |
| 2019/0279633 A1* | 9/2019 | Venkata | G10L 15/22 |
| 2019/0325081 A1* | 10/2019 | Liu | G06F 16/24575 |

* cited by examiner

QUESTION ANSWERING FOR A MULTI-MODAL SYSTEM

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of a computing device to perform tasks based on the user's spoken commands. The combination of speech recognition processing and natural language understanding processing techniques is referred to herein as speech processing. Speech processing may also involve converting a user's speech into text data which may then be provided to speechlets.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
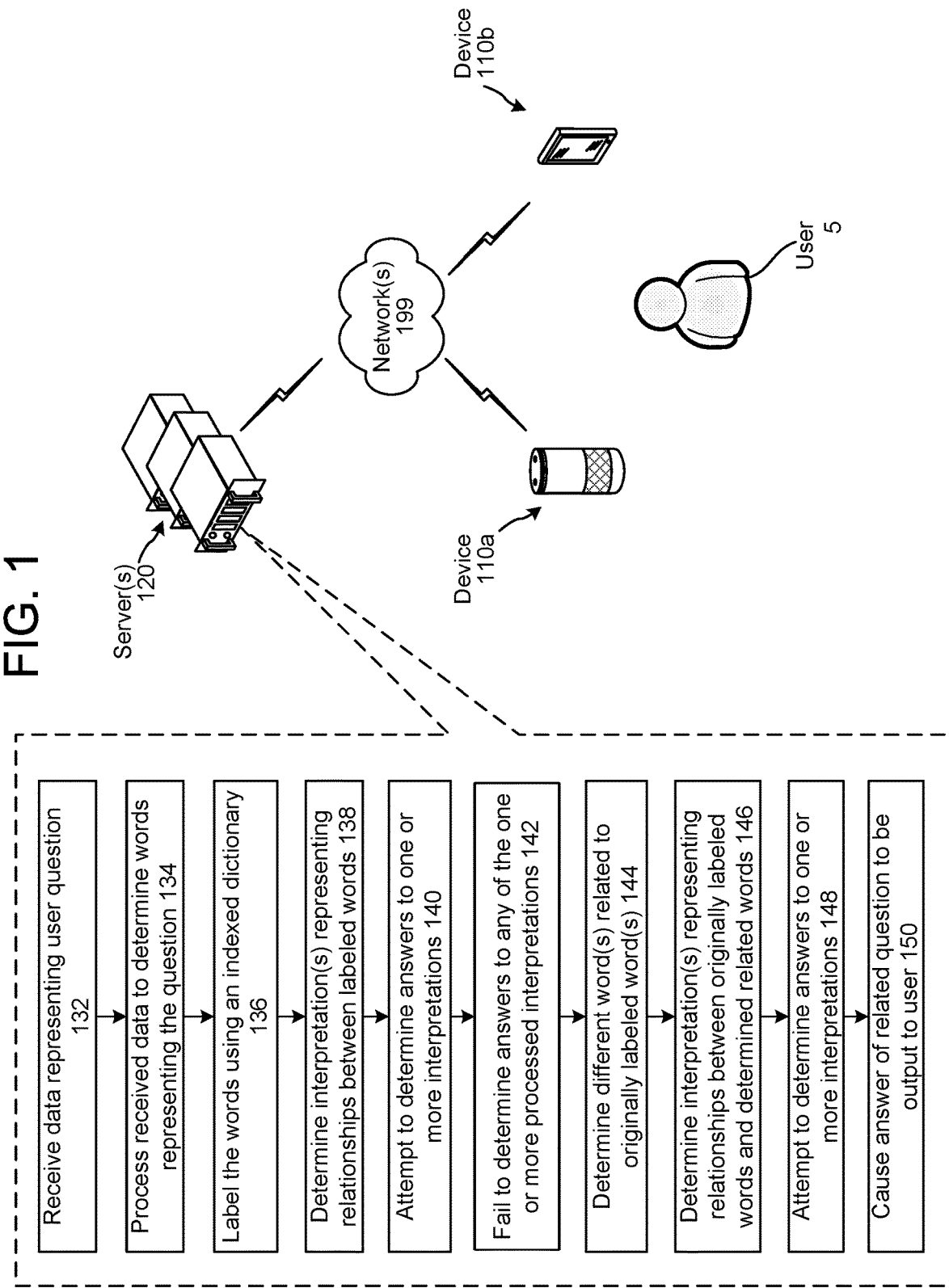
FIG. 1 illustrates a system configured to determine answers to user inputs according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

A system may be configured to receive and answer user questions. For example, a user may speak a question or provide a text-based question to the system. An example question includes "what is the longest river in Spain."

Often times, the system may determine an answer to a user question. The system may be configured with multiple types of question and answer (Q&A) techniques that collectively provide the system with a high probability of determining an answer to any particular question. Yet, there may be instances when the system is unable to determine an answer to a specific user question. For example, the system may not know the answer to "what is the longest river in Spain." Even so, the system may have certain information that while not responsive to the specific question that was asked, may be interesting to a user.

The present disclosure provides techniques for, when the system is unable to determine an answer to the user question, identifying a different question related to the user question that the system can answer, and then providing the answer to that different question. The system may include a knowledge base including an ontology of data connected through various relationships. The system may use the knowledge base (or other information sources) to determine what different questions are sufficiently related to the original question that they may be substituted for answering purposes.

When the system receives a question from a user, the system may parse the question to identify the important words making up the question. The system may then process the words against an indexed dictionary of words to piece the words of the question together to from different possible relationships that may exist between the words. For example, for the question of "what is the longest river in Spain," the system may, using the indexed dictionary, determine "longest" corresponds to a dimension, "river" corresponds to a body of water, and "Spain" corresponds to a country. Based on these indexed words, the system may determine "river" is modified by the dimension "longest" and "Spain" corresponds to a location of the river. As can be appreciated, many such parsing examples are possible.

The system may attempt to determine an answer to the original question using the indexed words. If the system determines an answer, the system may output the answer to the querying user. If the system is unable to determine an answer, the system may navigate through the ontology of relationships within the knowledge base to determine a question that is related to the user-posed question and for which the system has an answer.

According to the above example, the system may be unable to determine an answer for "what is the longest river in Spain." After failing to determine an answer, the system may determine similar items to those previously indexed and determine if the system has an answer for the user question restructured with the similar item(s). For example, the system may change the body of water from "river" to "lake" and determine whether the system knows an answer to "what is the longest lake in Spain." For further example, the system may change the dimension from "longest" to "widest" and determine whether the system knows an answer to "what is the widest river in Spain." For yet further example, the system may change the country from "Spain" to "Portugal" or "Europe" and determine whether the system knows an answer to "what is the longest river in Portugal" or "what is the longest river in Europe," respectively. Again, as can be appreciated, many such examples are possible.

If the system determines an answer to a related question, the system may output the answer to the user. If the system is unable to determine an answer to the related question, the system may either attempt to determine answers to other related questions or output an indication to the user that the system could not determine an answer.

A system implementing the present disclosure may require user permission to perform the teachings herein. That is, a system may require a user opt in, with informed consent, prior to the system being able to implement the teachings herein with respect to the user.

FIG. 1 illustrates a system configured to determine answers to user queries. Although the figures and discussion of the present disclosure illustrate certain operational steps of the system in a particular order, the steps described may be performed in a different order (as well as certain steps removed or added) without departing from the intent of the disclosure. Devices (110a/110b) local to a user 5 and one or more servers 120 may communicate across one or more networks 199.

The user 5 may speak a question to a device (110a/110b). The device (110a/110b) captures audio corresponding to the speech and generates audio data corresponding to the captured audio. The device (110a/110b) sends the audio data to the server(s) 120 for processing.

Alternatively, the user 5 may input text, corresponding to a question, to the device 110b via a keyboard or speech that the device 110b converts to text. The device 110b generates text data corresponding to the text and sends the text data to the server(s) 120, for example via a companion application operating on the device 110b and in communication with the server(s) 120.

The server(s) 120 receives (132) data (e.g., audio data or text data) representing the user's question. The server(s) 120 processes (134) the received data to determine words representing a question. For example, the server(s) 120 may process text data received from the device 110b or text data generated by performing ASR processing on audio data received from the device (110a/110b).

The server(s) 120 labels (136) the words using an indexed dictionary. The indexed dictionary may include various words that are associated with respective labels. When the server(s) 120 determines a word of the question corresponds to a word in the indexed dictionary, the server(s) 120 associates the word of the question with the label of the corresponding word in the indexed dictionary. For example, the question may correspond to "what is the longest river in Spain." The server(s) 120 may determine "longest" is represented in the indexed dictionary as being associated with a "descriptor" label, "Spain" is represented in the indexed dictionary as being associated with an entity (e.g., a country) label, and "river" is represented in the indexed dictionary as being associated with an attribute (e.g., a body of water) label. Many different categories of labels are possible.

The server(s) 120 thereafter determines (138) one or more interpretations, with each interpretation representing particular relationships between the labeled words. According to the above example, one interpretation may represent that Spain can have rivers while another interpretation may represent that rivers can have Spain.

The server(s) 120 may be configured to implement one or more heuristics. The heuristics may enable the server(s) 120 to determine relationships between certain types of data. For example, a heuristic may indicate that entities and attributes are related in some manner. For further example, a heuristic may indicate that collection names (e.g., "bodies of water") and dimensions are related in some manner.

The server(s) 120 may determine labeled words, corresponding to a single user query, have many different interpretations (e.g., different questions including different pluralities of words) based on the heuristics implemented by the server(s) 120. The server(s) 120 may generate a confidence value for each determined interpretation. A confidence value may represent the confidence of the server(s) 120 in the interpretation (e.g., question) associated with the confidence value. A confidence value may be represented as a numeric value (e.g., between 0 and 1, or some other scale) or a binned value (e.g., low, medium, high, or some other binned designation).

The server(s) 120 may attempt (140) to determine answers to one or more of the interpretations (e.g., first and second questions including different pluralities of words). The server(s) 120 may be capable of attempting to determine an answer to each determined interpretation (e.g., question). However, processing with respect to each interpretation may lead to processing duration becoming an issue. Thus, the server(s) 120 may implement thresholding such that the server(s) 120 may only attempt to determine an answer for (i) N number of top scoring interpretations (e.g., questions) or (ii) only the interpretations (e.g., questions) associated with confidence values satisfying a confidence threshold. Moreover, the server(s) 120 may determine to only process with respect to the top scoring interpretation (e.g., question) if a difference between the top scoring interpretation and the second top scoring interpretation meets or exceeds a threshold difference.

The server(s) 120 may determine answers to more than one interpretation. When this occurs, the server(s) 120 may cause the answer, of the highest scoring interpretation having an answer, to be output to the user 5 via a device (110a/110b). Alternatively, the server(s) 120 may fail (142) to determine answers to any of the processed interpretations.

When the server(s) 120 fails to determine any answers, the server(s) 120 may determine (144) different words related to the originally labeled words of the question. According to the above example, the question of "what is the longest river in Spain" may originally be parsed to represent that "longest" corresponds to a dimension, "Spain" corresponds to an entity, and "river" corresponds to an attribute. After failing to determine any answers, the server(s) 120 may determine "longest" is related to "widest," which may similarly be labeled as a dimension in the indexed dictionary. The server(s) 120 may also determine "Spain" is related to "Portugal," which may similarly be labeled as an entity in the indexed dictionary and which the server(s) 120 may determine is a neighboring country to Spain using one or more knowledge sources. The server(s) 120 may also determine "Spain" is related to "Europe," which may similarly be labeled as an entity in the indexed dictionary and which the server(s) 120 may determine includes Spain using one or more knowledge sources. The server(s) 120 may also determine "river" is related to "lake" or "ocean," which may similarly be labeled as attributes (and more particularly bodies of water) in the indexed dictionary.

The server(s) 120 determines (146) interpretations representing relationships between the originally labeled and/or newly determined related words. The server(s) 120 may use the same heuristics that were used to determine the original interpretations. A single new interpretation may use one newly determined related word or more than one newly determined related word. As described above, the original question corresponded to "what is the longest river in Spain." Using the foregoing as an example, the new interpretations may correspond to related questions such as:

"what is the widest river in Spain," where "longest" was replaced with the related word "widest;" "what is the longest lake in Spain," where "river" was replaced with the related word "lake;" "what is the longest river in Europe," where "Spain" was replaced with the related word "Europe;" "what is the longest lake in Portugal," where "river" was replaced with the related word "lake" and "Spain" was replaced with the related word "Portugal;" etc. As another example, the original question may correspond to "what is the largest state in the United States of America." The server(s) 120 may generate, for this example, the following new interpretations when an answer is unknown to the original question: "what is the largest country in South America," where "state" and "United States of America" were replaced with the related words "country" and "South America," respectively; "what is the smallest state in the United States," where "largest" was replaced with the related word "smallest;" etc.

As described, the server(s) 120 may be configured to change one or more than one words of the original question (e.g., a first word in the original question may be changed to a second word and/or a third word in the original question may be changed to a fourth word) to generate the new interpretations representing new questions related to the original question. The server(s) 120 may be configured with intelligence that enables the server(s) 120 to determine how many words it may change in a given instance, as changing too many words of the original question may result in the new interpretations becoming unrelated to the original question. If the new interpretations are no longer related to the original question, any answers to the new interpretations may not be relevant to the user 5, resulting in a negative user experience.

The server(s) 120 may attempt (148) to determine answers to one or more of the new interpretations. Like with the original interpretations, the server(s) 120 may implement thresholding such that the server(s) 120 may only attempt to determine an answer for a subset of the newly determined interpretations. Moreover, like with the original interpretations, the server(s) 120 may determine to only process with respect to the top scoring new interpretation rather than more than one new interpretation.

The server(s) 120 may determine answers to one or more of the new interpretations (e.g., a second question and a third question). Each answer may be associated with a confidence value representing the system's confidence in the answer. The server(s) 120 may cause (150) the highest scoring answer (if the highest scoring answer is associated with a confidence value satisfying a threshold confidence value) to be output to the user 5 via a device (110a/110b). If the server(s) 120 fails to determine any answers associated with confidence values that satisfy a confidence value threshold, the server(s) 120 may again perform steps (144) through (148) to in an attempt to determine an answer to another question related to the original question, or the server(s) 120 may choose to indicate to the user 5 that the server(s) 120 could not determine an answer to the user-posed question.

An orchestrator component 230, a question & answer (Q&A) service 265, or one or more components of the orchestrator component 230 or Q&A service 265, may perform the processed described herein for determining questions related to user posed questions.

Figure 2:
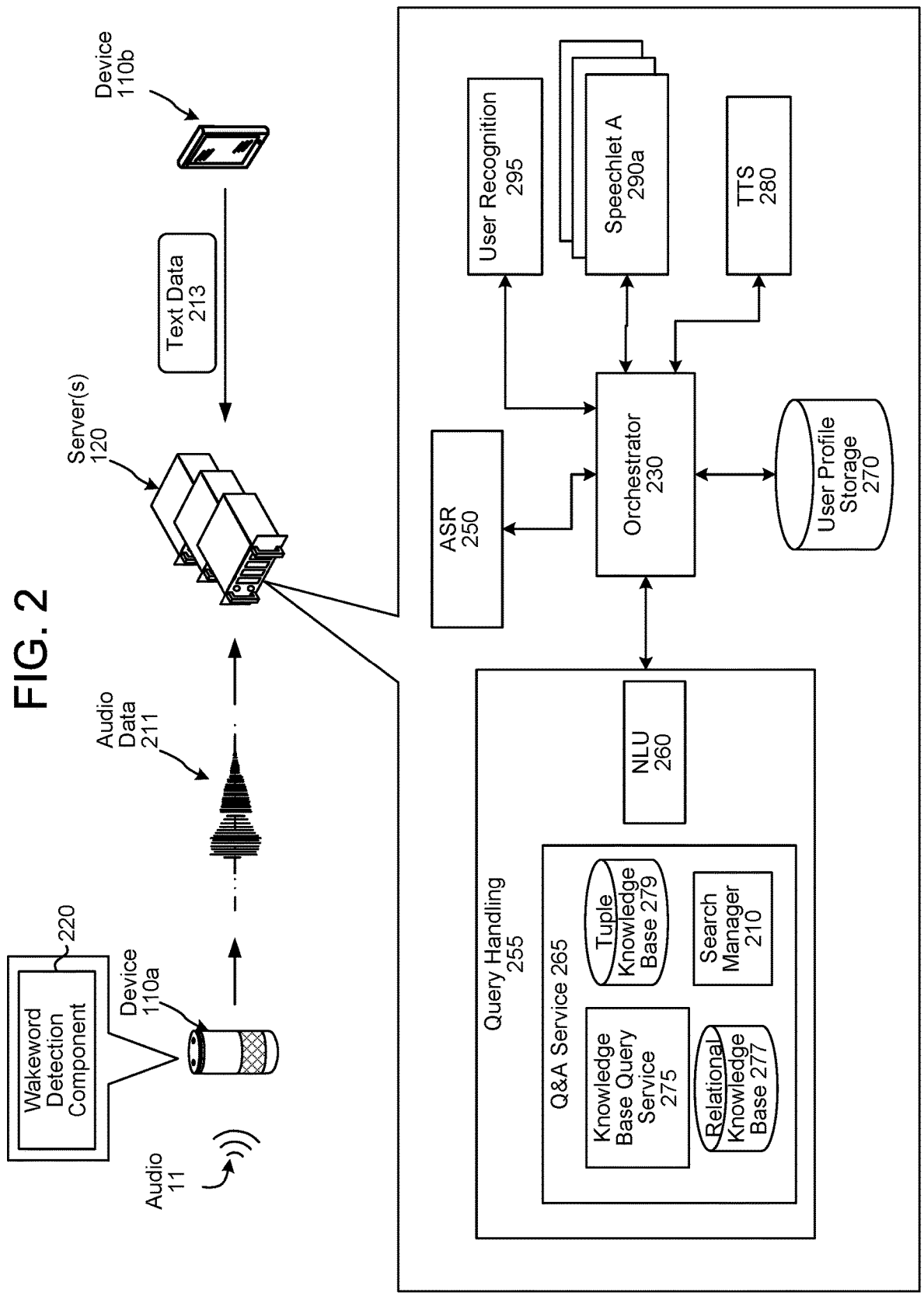
FIG. 2 is a conceptual diagram for processing user input according to embodiments of the present disclosure.

FIG. 2 is a conceptual diagram of how user inputs may be processed. The various components illustrated in FIG. 2 may be located on a same or different physical devices. Communication between various components illustrated in FIG. 2 may occur directly or across one or more networks 199.

An audio capture component(s), such as a microphone or array of microphones of the device 110a, captures audio 11. The device 110a, using a wakeword detection component 220, processes the audio 11, or audio data representing the audio, to determine if a keyword, such as a wakeword, is detected in the audio 11. Following detection of a wakeword, the device 110a sends audio data 211, corresponding to an utterance represented in the audio 11 or corresponding audio data, to the server(s) 120.

The wakeword detection component 220 works in conjunction with other components of the device 110a, for example a microphone (not illustrated) to detect keywords in the audio 11. For example, the device 110a may convert the audio 11 into audio data, and process the audio data with the wakeword detection component 220 to determine whether speech is detected, and if so, if the audio data comprising speech matches an audio signature and/or model corresponding to a particular keyword.

The device 110a may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11 received by the device 110a, the device 110a may use the wakeword detection component 220 to perform wakeword detection to determine when a user intends to speak an input to the device 110a. This process may also be referred to as keyword detection, with the wakeword being a specific example of a keyword. Keyword detection is typically performed without performing linguistic analysis, textual analysis, or semantic analysis. Instead, the audio 11 (or audio data representing the audio 11) is analyzed to determine if specific characteristics of the audio 11 (or audio data) match preconfigured acoustic waveforms, audio signatures, or other data to determine if the audio 11 (or audio data) "matches" stored audio data corresponding to a keyword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio 11, to the server(s) 120. The audio data 211 may include data corresponding to the wakeword, or the portion of the audio data 211 corresponding to the wakeword may be removed by the device 110a prior to sending the audio data 211 to the server(s) 120.

Upon receipt by the server(s) 120, the audio data 211 may be sent to an orchestrator component 230. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing an utterance represented in the audio data 211. The ASR component 250 interprets the utterance in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the utterance represented in the audio data 211. The ASR component 250 sends the text data generated thereby to a query handling component 255, either directly or via the orchestrator component 230. The text data sent from the ASR component 250 to the query handling component 255 may include a top scoring hypothesis or may include an N-best list including multiple hypotheses. An N-best list may additionally include a respective score associated with each hypothesis represented therein. Each score may indicate a confidence of ASR processing performed to generate the hypothesis with which the score is associated.

Alternatively, the device 110b may send text data 213 to the server(s) 120. Upon receipt by the server(s) 120, the text data 213 may be sent to the orchestrator component 230. The orchestrator component 230 may send the text data 213 to the query handling component 255.

The query handling component 255 may attempt to process the text data (either generated by the ASR component 250 or received from the device 110b) in a number of ways. Those ways may be executed at least partially in parallel. The text data may be sent to a Q&A service component 265. At this point in time, the Q&A service component 265 assumes the text data corresponds to a request for information. As the Q&A service component 265 may operate at least partially in parallel to an NLU component 260, the Q&A service component 265 may not know if the text data actually corresponds to a request for information, but processing the text data at least partially in parallel between the NLU component 260 and Q&A service component 265 may result in reduced latency.

The text data may be sent to a knowledge base query service 275 which may work in conjunction with a tuple structured knowledge base 279 to attempt to obtain information responsive to the text data. The tuple knowledge base 279 may include a collection of tuples or otherwise semantically (or otherwise) encoded data that can be queried to obtain information. In such a tuple knowledge base 279, information may be stored in a "tuple" format, where entities are joined together in pairs, triplets, or the like, that define the relationship between two things. For example, a tuple such as [John Doe, husband of, Jane Doe] may describe that John Doe is Jane Doe's husband. Many such tuples may exist in a knowledge base and may be usable to answer user inputs. For example, the above tuple may be used to answer a question such as "who is Jane Doe's husband," "who is John Doe married to," or the like.

The knowledge base query service 275 may also work in conjunction with a relational knowledge base 277 to attempt to obtain information responsive to the text data. In the relational knowledge base 277, information may be stored in a form representative of a knowledge graph. The knowledge graph may comprise a directed acyclic graph (DAG) with graph nodes representing entities (e.g., people, places, things) connected by vertices or links where each link corresponds to a relationship. To answer questions about particular entities in a knowledge graph, the system may traverse a path along the knowledge graph from one entity to another and track the information along the traversed links to obtain information about how one entity relates to another. For example, a DAG may include a node for Jane Doe, a node for John Doe, a node for Jake Doe, etc. A link between Jane Doe and John Doe may be associated with a variety of information such as "married in 2002," "met in 2000," etc. A link between John Doe and Jake Doe may be associated with information such as "brothers" or the like. Even if there is no direct link between the node for Jane Doe and the node for Jake Doe, the system may be able to determine a path between the two, and gather information along the vertices along that path (e.g., from Jane Doe to John Doe and then from John Doe to Jake Doe) to obtain information needed to answer the query "when did John Doe become the brother-in-law of Jane Doe." The techniques described herein with respect to determining an answer to a question related to the user-posed question may include navigating the knowledge graph of the relational knowledge base 277.

At least partially in parallel to the knowledge base query service 275 attempting to find an answer to the text data using the tuple knowledge base 279 and/or the relational knowledge base 277, the Q&A service 265 may operate a search manager 210 to attempt to find an answer to the text data using an unstructured web search. The search manager 210 may input a text string into a search engine. The result for such a web query often takes the form of a list of Internet links rather than an answer to a specific question, and further web queries make no effort at any semantic understanding, relying instead on a solely keyword based search approach.

At least partially in parallel to the operations of the Q&A service component 265, the system may process the text data using the NLU component 260. The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent representing an action that a user desires be performed as well as pieces of the text data that allow a device (e.g., the device 110a, the device 110b, the server(s) 120, a speechlet component 290, a speechlet server(s) (not illustrated), etc.) to execute the intent. For example, if the text data corresponds to "play Adele music," the NLU component 260 may determine an intent that the system output Adele music and may identify "Adele" as an artist. For further example, if the text data corresponds to "what is the weather," the NLU component 260 may determine an intent that the system output weather information associated with a geographic location of the device 110. For yet further example, if the text data corresponds to "who is John Smith," the NLU component 260 may determine an intent that the system output information describing John Smith.

The output from the NLU component 260 (which may include tagged text data, indicators of intent, etc.) may then be sent to a speechlet(s) component 290. A "speechlet" may be software running on the server(s) 120 that is akin to a software application running on a traditional computing device. A speechlet may enable the server(s) 120 to execute specific functionality in order to provide data or produce some other requested output. The server(s) 120 may be configured with more than one speechlet. For example, a weather service speechlet may enable the server(s) 120 to provide weather information, a car service speechlet may enable the server(s) 120 to book a trip with respect to a taxi or ride sharing service, an order pizza speechlet may enable the server(s) 120 to order a pizza with respect to a restaurant's online ordering system, a communications speechlet may enable the system to perform messaging or multi-endpoint communications, a Q&A speechlet may enable the server(s) 120 to provide various Q&A information, etc. A speechlet component 290 may operate in conjunction between the server(s) 120 and other devices such as a device 110 in order to complete certain functions. Inputs to a speechlet component 290 may come from speech processing interactions or through other interactions or input sources.

A speechlet component 290 may include hardware, software, firmware, or the like that may be dedicated to a particular speechlet component 290 or shared among different speechlet components 290. A speechlet component 290 may be part of the server(s) 120 (as illustrated in FIG. 2) or may be located at whole (or in part) with separate speechlet servers (not illustrated). A speechlet server(s) may communicate with a speechlet component(s) 290 within the server(s) 120 and/or directly with the orchestrator component 230 or with other components. Unless expressly stated otherwise, reference to a speechlet, speechlet device, or speechlet component may include a speechlet component 290 operating within the server(s) 120 and/or speechlet component 290 operating within a speechlet server(s).

A speechlet component 290 may be configured to perform one or more actions. An ability to perform such action(s) may sometimes be referred to as a "skill." That is, a skill may enable a speechlet component 290 to execute specific functionality in order to provide data or perform some other action requested by a user. A particular speechlet component 290 may be configured to execute more than one skill/action. For example, a weather service skill may involve a weather speechlet providing weather information to the server(s) 120, a car service skill may involve a car service speechlet booking a trip with respect to a taxi or ride sharing service, an order pizza skill may involve a restaurant speechlet ordering a pizza with respect to a restaurant's online ordering system, etc.

A speechlet component 290 may be in communication with one or more speechlet servers implementing different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, as well as custom skills that are not associated with any pre-configured type of skill.

If the NLU component's output represents a Q&A speechlet component, the NLU output may be sent to the Q&A speechlet component (which is represented as the Q&A service 265 in FIG. 2). The Q&A service 265 may simply use the NLU output as a confirmation that the text data the Q&A service 265 was processing, in parallel to the NLU component's processing, in fact corresponds to a question.

In certain instances, a speechlet component 290 may output data in a form suitable for output to a user (e.g., via a device 110). In other instances, a speechlet component 290 may output data in a form unsuitable for output to a user. Such an instance includes a speechlet component 290 providing text data while audio data is suitable for output to a user.

The server(s) 120 may include a TTS component 280 that generates audio data from text data using one or more different methods. The audio data generated by the TTS component 280 may then be output by a device 110 as synthesized speech. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The server(s) 120 may include a user profile storage 270. The user profile storage 270 may include a variety of information related to individual users, groups of users, etc. that interact with the system. The user profile storage 270 may include one or more customer profiles. Each customer profile may be associated with a different customer ID. A customer profile may be an umbrella profile specific to a group of users. That is, a customer profile encompasses two or more individual user profiles, each associated with a respective user ID. For example, a customer profile may be a household profile that encompasses user profiles associated with multiple users of a single household. A customer profile may include preferences shared by all the user profiles encompassed thereby. Each user profile encompassed under a single customer profile may additionally include preferences specific to the user associated therewith. That is, each user profile may include preferences unique from one or more other user profiles encompassed by the same customer profile. A user profile may be a stand-alone profile or may be encompassed under a customer profile. As illustrated, the user profile storage 270 is implemented as part of the server(s) 120. However, one skilled in the art will appreciate that the user profile storage 270 may be in communication with the server(s) 120, for example over the network(s) 199.

The server(s) 120 may include a user recognition component 295. The user recognition component 295 may take as input the audio data 211, text data 213, and/or text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.) received by the system in correlation with the present user input to stored biometric data of users. The user recognition component 295 may further perform user recognition by comparing image data (e.g., including a representation of at least a feature of a user) received by the system in correlation with the present user input with stored image data (e.g., including representations of features of users). The user recognition component 295 may perform additional user recognition processes, including those known in the art. Output of the user recognition component 295 may include a single user ID corresponding to the most likely user that originated the current input. Alternatively, output of the user recognition component 295 may include an N-best list of user IDs with respective scores indicating likelihoods of respective users originating the current input. The output of the user recognition component 295 may be used to inform NLU component 260 processing, Q&A service 265 processing, as well as processing performed by speechlet components 290.

The relational knowledge base 277 may be populated with text data representing various entities, attributes, and the like. Various techniques may be used to create relationships between the different data in the relational knowledge base 277. In one technique, a user of the system may manually create relationships between data. Moreover, a user of the system may manually create relationships between portions of data corresponding to failed questions. A failed question refers to a question that the system is unable to determine an answer for. The system may provide a user with failed questions or a portion of failed questions that are frequently asked of the system (e.g., failed questions that have been input to the system at least a threshold number of times). A user may manually create associations between entities, attributes, and the like represented in the failed questions, and such associations may be persisted in the relational knowledge base 277.

Figure 3:
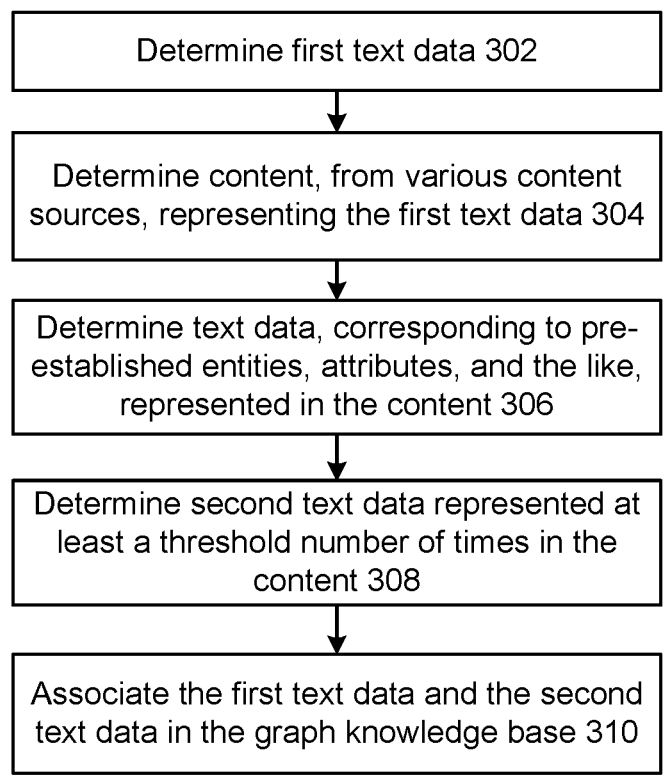
FIG. 3 is a process flow diagram illustrating how a component of a system may generate relationships between data in a graph knowledge base according to embodiments of the present disclosure.

In another technique, as illustrated in FIG. 3, a component of the system may create relationships between data based on use of the data by various content sources. The processes of FIG. 3 may preferably be performed offline, but may be performed at runtime.

The system may be pre-configured with text data (e.g., words) representing various items, such as entities, attributes, and the like. The system may determine (302) first text data (e.g., a first word) corresponding to a pre-established entity, attribute, or the like.

The system may also have access to various content sources, including Internet webpages. The system may determine (304) content (e.g., first content and second content), from the various content sources (e.g., a first content source and a second content source), representing the first text data (e.g., the first word).

Since the system is pre-configured with text representing various items, the system may determine (306) text data (e.g., words), corresponding to pre-established entities, attributes, and the like, represented in the text data. The system may thereafter determine (308) second text data (e.g., a second word or third word), corresponding to a pre-established entity, attribute, or the like, that is collectively represented in the content (e.g., the first content and the second content) at least a threshold number of times. For example, the system may use machine learning, word embedding, etc. to determine words in the relational knowledge base 277 that are present in the content. Based on the original determination of the content based on the first text data (e.g., the first word) and the determination that the second text data (e.g., the second word or the third word) is collectively represented in the content (e.g., the first content and the second content) at least the threshold number of times, the system may associate (310) the first text data (e.g., the first word) and the second text data (e.g., the second word or the third word) in the relational knowledge base 277.

Figure 4:
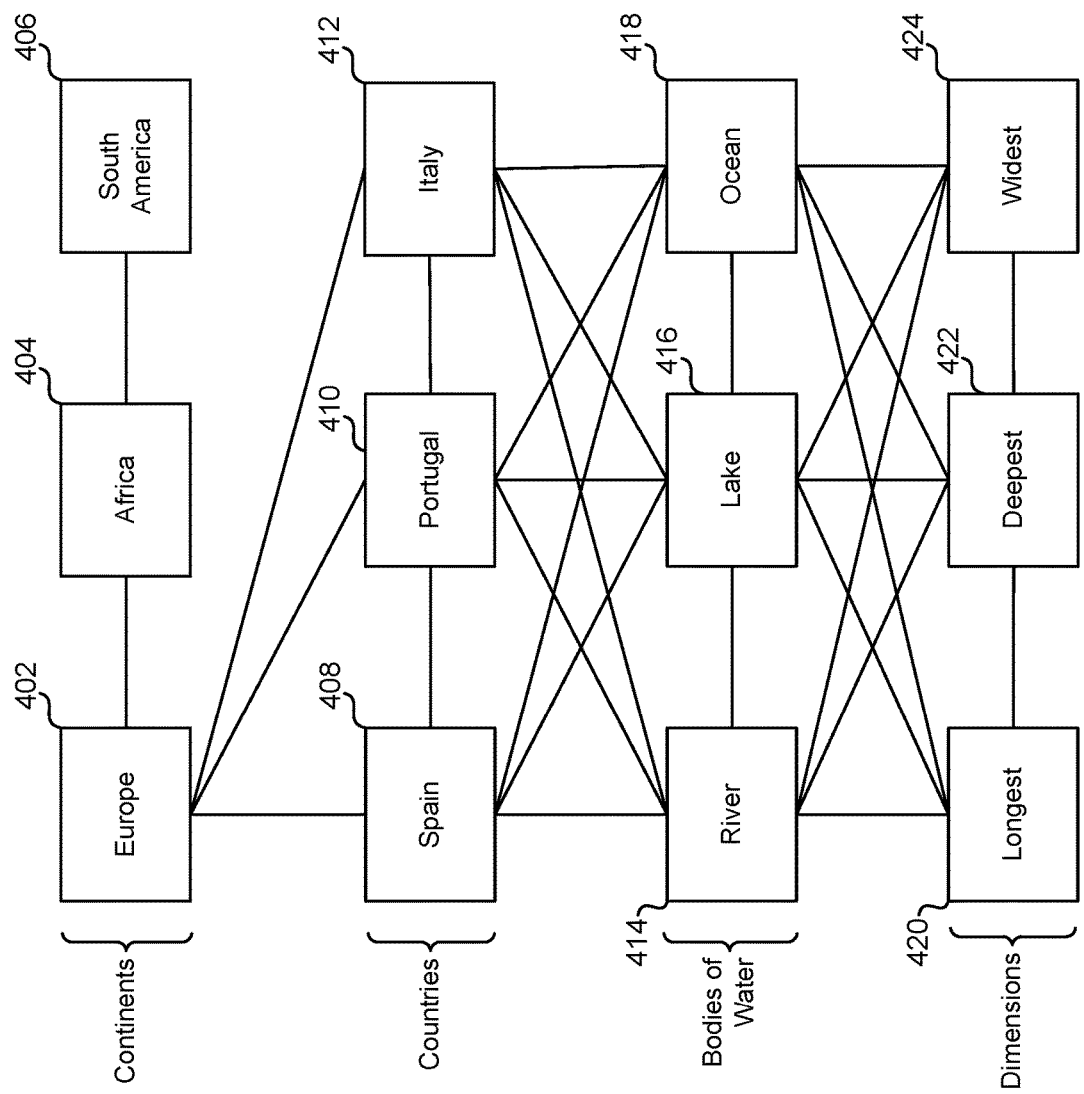
FIG. 4 illustrates associated data in a graph knowledge base according to embodiments of the present disclosure.

The system may perform the steps of FIG. 3 for various text data to generate associations between various data in the relational knowledge base 277. An example of associated data in the relational knowledge base 277 is illustrated in FIG. 4.

Horizontal associations in the relational knowledge base 277 may represent a category that all of the horizontally related items belong to. For example, as illustrated in FIG. 4, the associations between Europe, Africa, and South America may represent that Europe, Africa, and South America are each a continent. Likewise, the associates between Spain, Portugal, and Italy may represent that Spain, Portugal, and Italy are each a country.

Vertical associations in the relational knowledge base 277 may represent how one item of the association is dependent upon the other item of the association. For example, as illustrated in FIG. 4, metadata may indicate that Spain is included in Europe, that Spain includes rivers, and that a river includes dimensions.

Figure 5:
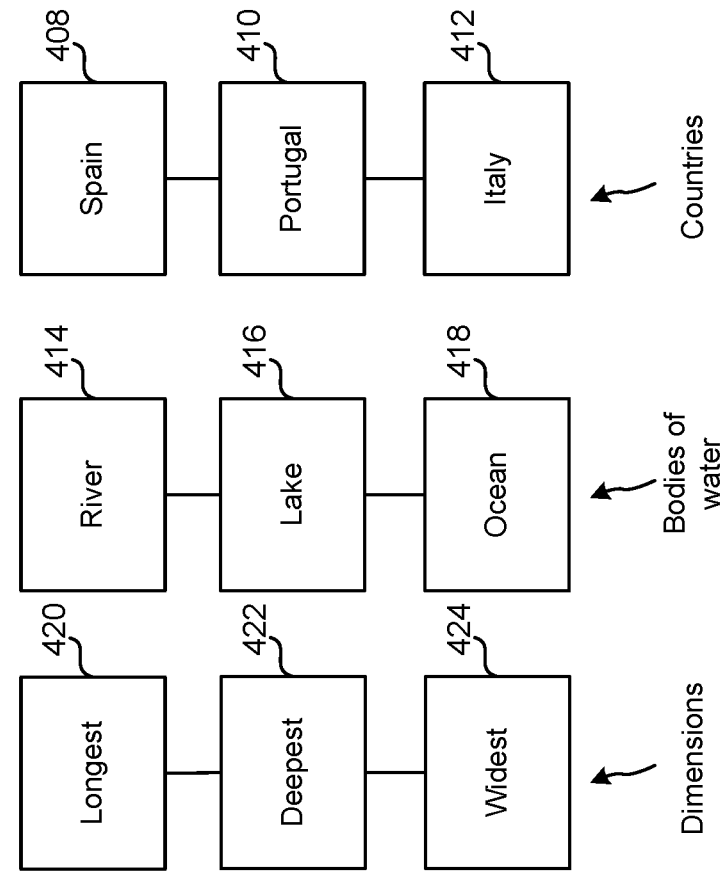
FIG. 5 illustrates determining a second question by replacing words of a first question using data of the graph knowledge base as illustrated in FIG. 4.

Data that is horizontally associated in the relational knowledge base 277 (e.g., words with a same entity type) may be interchanged to determine an answer to a related question, as described above. For example, with reference to FIG. 4, if the system is unable to determine an answer to the original user question of "what is the longest river in Spain," the system may perform one or more of the following: replace "Spain" with "Portugal" or "Italy," replace "river" with "lake" or "ocean;" and/or replace "longest" with "deepest" or "widest." In FIG. 5, the replacement words represented below a word(s) of the original question may be horizontally associated in the relational knowledge base 277, as illustrated in FIG. 4.

Data that is vertically associated in the relational knowledge base 277 may also be interchanged, in certain instances, to determine an answer to a related question. For example, with reference to FIG. 4, if the system is unable to determine an answer to the original user question of "what is the longest river in Spain," the system may replace "Spain" with "Europe" as Spain is a country within Europe, yet the system may not replace "river" with "Spain," "Portugal," or "Italy."

When the system decides to replace a word(s) with a vertically related word(s), the system may replace a word(s) of the original user question with a broader related entity, attribute, or the like. For example, the system may replace "Spain" with "Europe" but may not replace "Europe" with "Spain" because replacing a word(s) of an original user question with a word(s) narrower in scope is less likely to result in an answer than the originally posed broader word(s). The server(s) 120 may include logic that enables the server(s) 120 to replace a word(s) in a user question with a word(s) in the relational knowledge base 277 that is associated with a same or different label (e.g., entity, attribute, dimension, etc.).

As described, the relational knowledge base 277 may include various data linked by various associations. To ensure a most related answer to the user-posed question is output, the system may determine all permutations of the user question whereby one or more labeled words in the user question are replaced with one or more associated words in the relational knowledge base 277. The system may then attempt to determine answers for a portion or all of the different permutations.

Figure 6:
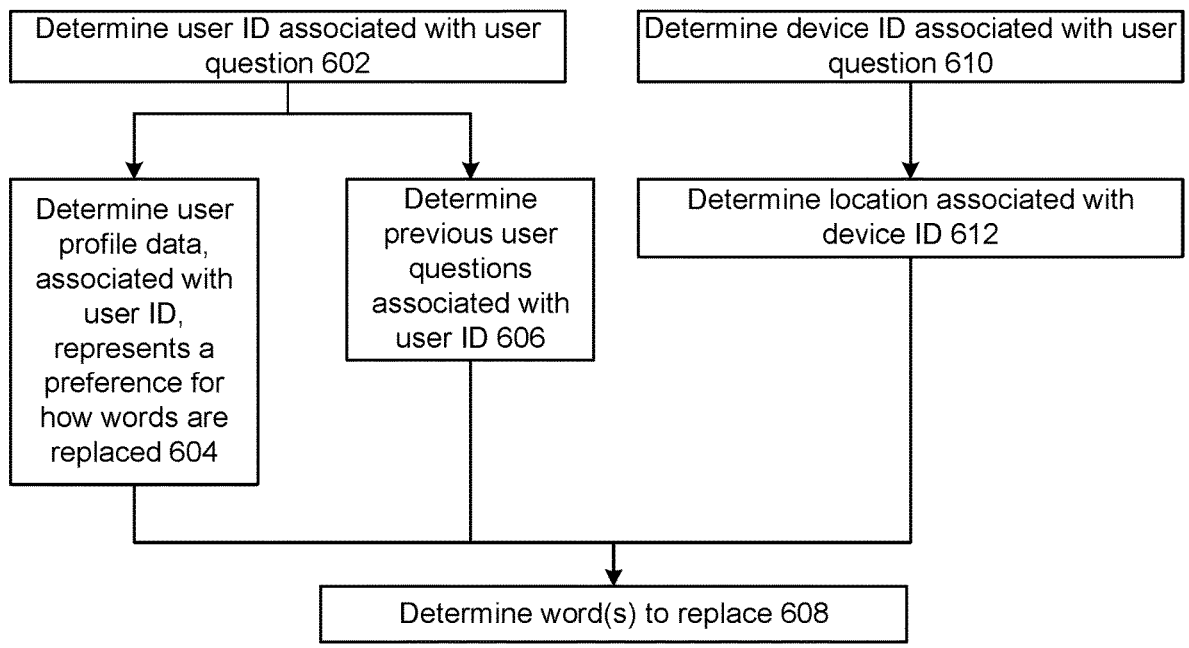
FIG. 6 is a process flow diagram illustrating how a system may determine one or more words related to one or more words in a user input according to embodiments of the present disclosure.

Alternatively, the system may be selective in the way the system replaces words of a user question with words associated therewith in the relational knowledge base 277. FIG. 6 illustrates how a system may determine how to replace words of a user question with words stored in the relational knowledge base 277.

The server(s) 120 may determine (602) a user identifier (ID) associated with a user that that originated the present user input. The server(s) 120 may determine such using one or more techniques described above with respect to the user recognition component 295.

The server(s) 120 may determine (604) user profile data, associated with the user ID, represents a preference for how words are to be replaced. For example, a user preference may indicate that a word(s) (e.g., a first word) should be replaced with a horizontally associated word(s) (e.g., a word(s) belonging to the same group, such as a word with the same entity type) in the relational knowledge base 277. Alternatively, a user preference may indicate that a word(s) should be replaced with a vertically associated word(s) (e.g., a word(s) belonging to a group that relates to the original word's group) in the relational knowledge base 277. Moreover, a preference may be specific to the type of label associated with the word. For example, a preference may indicate a word(s) in the user question (e.g., a first word) corresponding to an entity label (e.g., a first label) should be replaced with another word(s) (e.g., a second word) corresponding to an entity label (e.g., a second label) of the same label type (e.g., "Spain" and "Portugal" corresponding to the same entity label of "country," "Spain" and "Europe" corresponding to the same entity label of "land mass," etc.). The server(s) 120 may determine (608) the word(s) of the user question to replace based on the preference(s).

The server(s) 120 may also or alternatively determine (606) previous user questions associated with the user ID. The server(s) 120 may determine (608) the word(s) of the present user input to replace based on the previous user questions. For example, the previous user questions may be analyzed to determine at least a threshold of the previous user questions relate to a first geographic location, e.g., are associated with "Europe." Based on this, if the present user question asks something about a second geographic location, e.g., "Spain" that cannot be answered by the system, the system may replace "Spain" with "Europe."

The server(s) 120 may also or alternatively determine (610) a device ID associated with the device 110 from which the user question was received, determine (612) a location associated with the device ID, and determine (608) the word(s) of the user question to replace (e.g., a first word) based on the location. A device ID may be associated with a geographic location, such as Spain. Based on this, if the present user question asks something about a town in Spain that cannot be answered by the system, the system may replace the town's name (e.g., a first word) with "Spain" e.g., a third word).

The server(s) 120 may have access to information representing geographic relationships of entities. Thus, if a user question with respect to a first entity cannot be answered, the server(s) 120 may replace the entity with a second entity that is geographically near the first entity. For example, if the user question asks for information about Spain, the server(s) 120 may replace Spain with Portugal, France, or some other entity determined "geographically near" Spain.

Once the server(s) 120 has determined (608) the word(s) to replace, the server(s) 120 may perform steps 146-150 described with respect to FIG. 1, as well as other steps not discussed, to ultimately provide the user 5 with an answer to a question that is relevant to the user 5.

Figure 7:
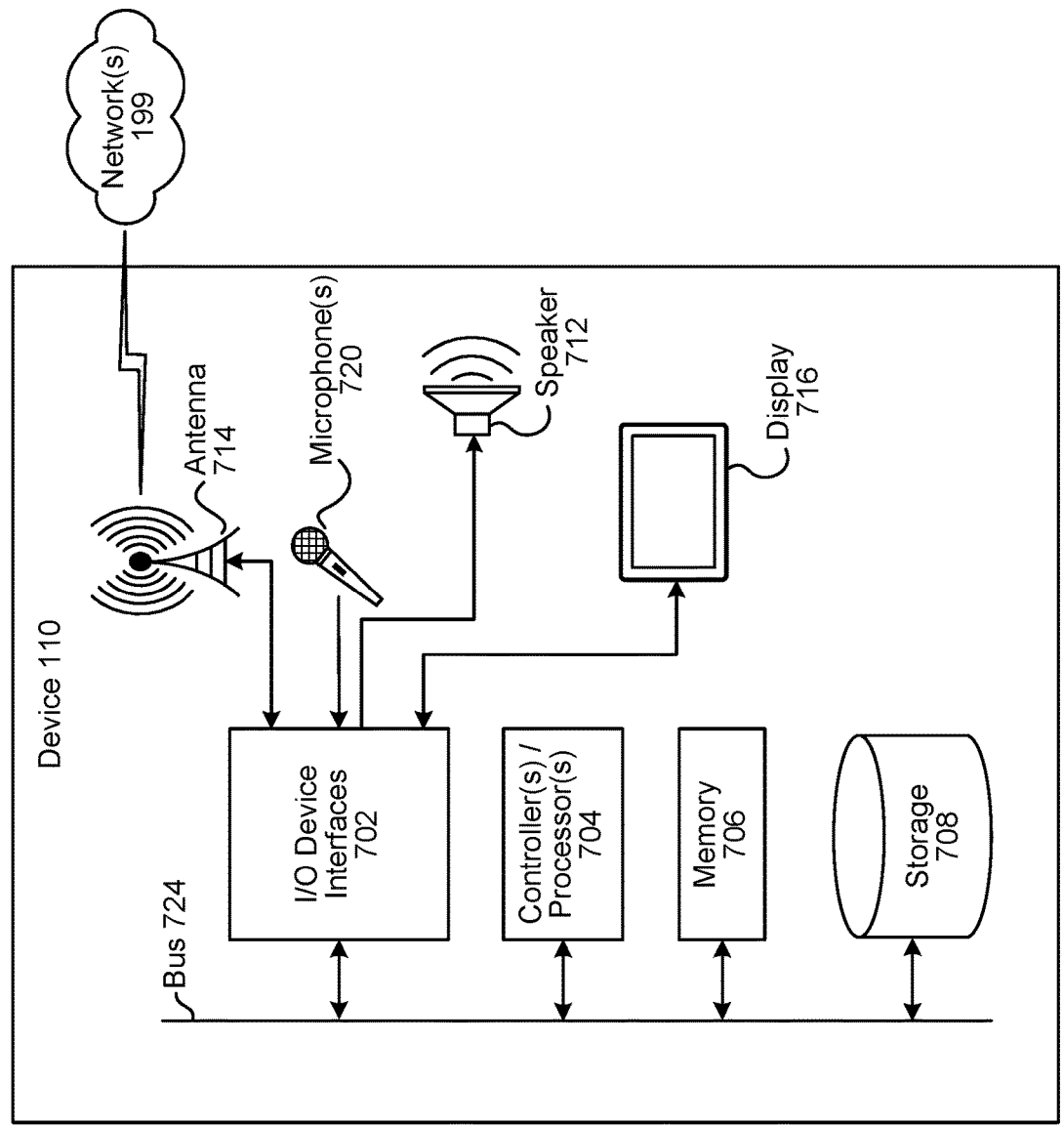
FIG. 7 is a block diagram conceptually illustrating example components of a device according to embodiments of the present disclosure.
Figure 8:
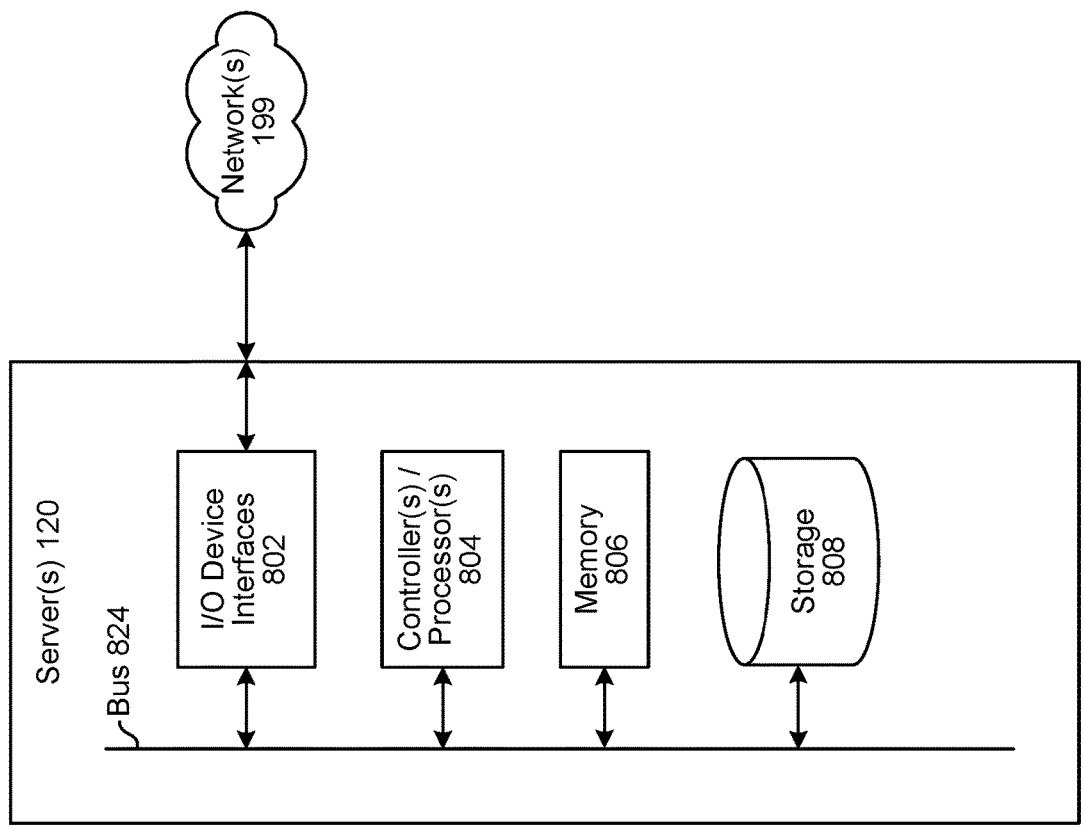
FIG. 8 is a block diagram conceptually illustrating example components of a server according to embodiments of the present disclosure.

FIG. 7 is a block diagram conceptually illustrating a device 110 that may be used with the system. FIG. 8 is a block diagram conceptually illustrating example components of a remote device, such as the server(s) 120, which may assist with ASR processing, NLU processing, etc. Multiple servers 120 may be included in the system, such as one or more servers 120 for performing ASR processing, one or more servers 120 for performing NLU processing, etc. In operation, each of these devices (or groups of devices) may include computer-readable and computer-executable instructions that reside on the respective device (110/120), as will be discussed further below.

Each of these devices (110/120) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120) may also include a data storage component (708/808) for storing data and controller/processor-executable instructions. Each data storage component (708/808) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (702/802).

Computer instructions for operating each device (110/120) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120) includes input/output device interfaces (702/802). A variety of components may be connected through the input/output device interfaces (702/802), as will be discussed further below. Additionally, each device (110/120) may include an address/data bus (724/824) for conveying data among components of the respective device. Each component within a device (110/120) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content.

Via antenna(s) 714, the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (702/802), processor(s) (704/804), memory (706/806), and/or storage (708/808) of the device(s) 110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are illustrative, and may be located as a stand-alone device or may be included, in whole or in part, as a component of a larger device or system.

Figure 9:
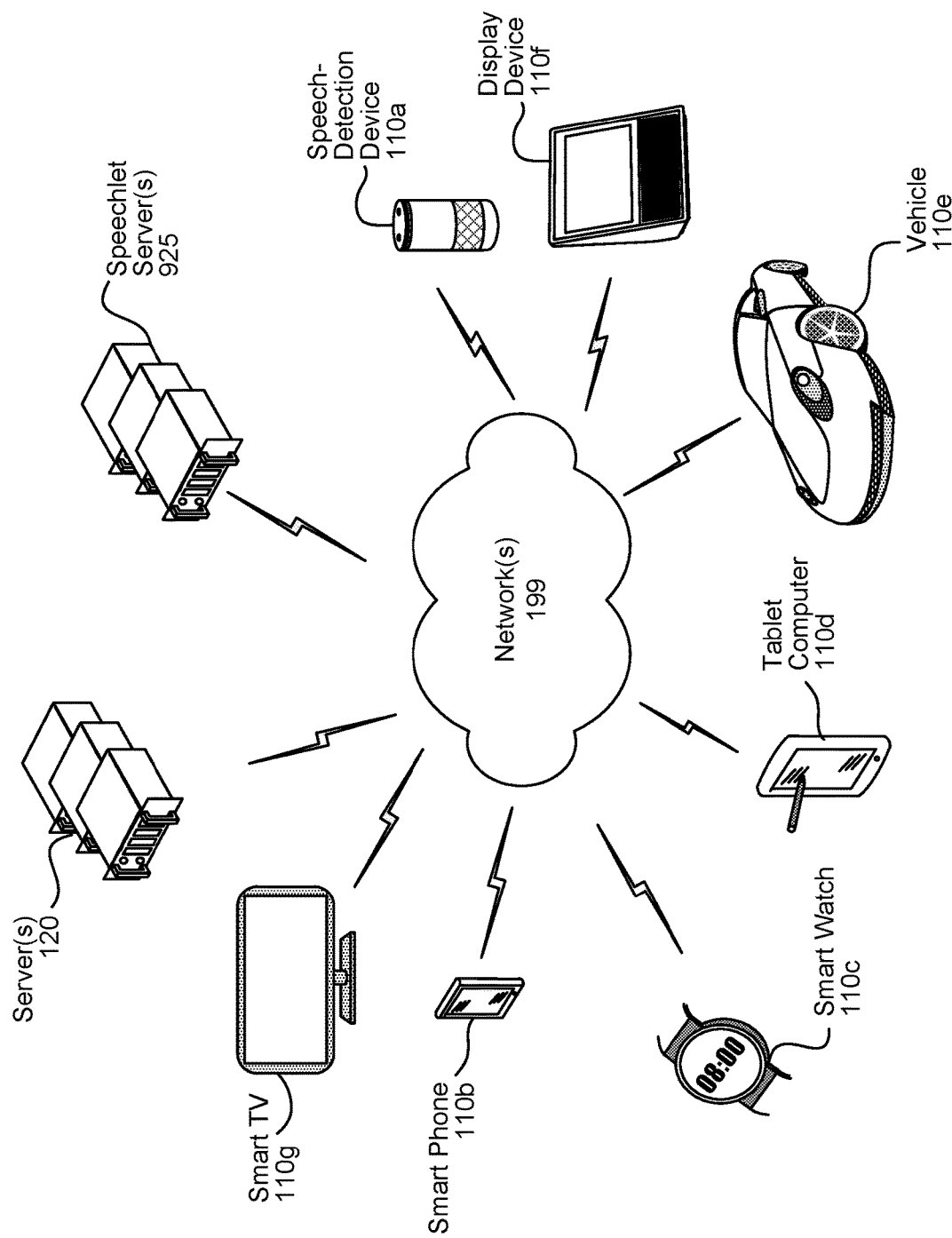
FIG. 9 illustrates an example of a computer network for use with a speech processing system.

As illustrated in FIG. 9, multiple devices (110a-110g, 120, 925) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, the speechlet server(s) 925, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
   receiving, from a first device, first audio data representing first speech;
   determining that the first speech corresponds to a first question that includes a first word and a second word;
   determining that the first word-corresponds to a first entity;
   determining that the second word corresponds to a first attribute;
   performing, by a computing system, a first query of at least one knowledge base for first information responsive to the first question, wherein the at least one knowledge base stores information regarding associations between entities and attributes, and performing the first query comprises querying the at least one knowledge base for a second entity that is associated with the first entity and the first attribute;
   determining, based at least in part on a result of the first query, that the computing system is unable to determine the first information using the result of the first query; and
   based at least in part on the computing system being unable to determine the first information:
      determining a third word associated with the first word,
      determining a second question using the third word and the second word,
      determining that the third word corresponds to a third entity,
      performing a second query of the at least one knowledge base for second information responsive to the second question, wherein performing the second query comprises querying the at least one knowledge base for a fourth entity that is associated with the third entity and the first attribute,
      obtaining, from the at least one knowledge base, second information that is responsive to the second question, and
      causing the first device to output a representation of the second information.

2. The method of claim 1, further comprising:
   determining first content, associated with a first content source, representing the first word;
   determining second content, associated with a second content source, representing the first word;
   determining that the third word is collectively represented in the first content and the second content at least a threshold number of times; and
   based at least in part on the third word being collectively represented in the first content and the second content at least the threshold number of times, associating the first word and the third word in the at least one knowledge base.

3. The method of claim 1, further comprising:
   determining a user identifier associated with the first audio data;
   determining that user profile data, associated with the user identifier, represents a preference indicating the first word is to be replaced with a word associated with a same entity type;
   determining that the first entity and the second entity both correspond to a first entity type; and
   determining that the third word is to replace the first word based at least in part on the first entity and the second entity both corresponding to the first entity type.

4. The method of claim 3, further comprising:
   determining a device identifier associated with the first device;
   determining that the device identifier is associated with a first geographic location;
   determining that the third word corresponds to the first geographic location;
   determining that the first word corresponds to a second geographic location; and
   determining that the third word is to replace the first word.

5. A method, comprising:
   determining, by a computing system, first data representing a user input;
   determining that the first data corresponds to a first question including a first plurality of words, the first plurality of words including a first word corresponding to a first entity and a second word corresponding to a first attribute;
   performing a first query of at least one knowledge base for first information responsive to the first question, wherein the at least one knowledge base stores information regarding associations between entities and attributes, and performing the first query comprises querying the at least one knowledge base for at least one of an entity or an attribute that is associated with the first entity and the first attribute;
   determining, based at least in part on a result of the first query, that the computing system is unable to determine the first information using the result of the first query; and
   based at least in part on the computing system being unable to determine the first information:
      determining a third word associated with the first word, the third word corresponding to a second entity,
      determining a second question including the third word instead of the first word,
      performing a second query of the at least one knowledge base for second information responsive to the second question, wherein performing the second query comprises querying the at least one knowledge base for at least one of an entity or an attribute that is associated with the second entity and the first attribute,
      obtaining, from the at least one knowledge base, second information that is responsive to the second question, and
      causing a first device to output a representation of the second information.

6. The method of claim 5, further comprising:
   determining that the first data corresponds to a third question including a second plurality of words;
   determining a first confidence value for the first question;
   determining a second confidence value for the third question;
   determining that the first confidence value is greater than the second confidence value; and
   based at least in part on the first confidence value being greater than the second confidence value, determining to perform the first query of the at least one knowledge base for the first information.

7. The method of claim 5, further comprising:
determining a plurality of content, associated with a plurality of content sources, representing the first word;
determining that the third word is represented in the plurality of content at least a threshold number of times; and
based at least in part on the third word being represented in the plurality of content at least the threshold number of times, associating the third word and the first word in the at least one knowledge base.

8. The method of claim 5, further comprising:
determining a user identifier associated with the first data;
determining that user profile data, associated with the user identifier, represents a preference indicating the first word is to be replaced with a word associated with a same label type;
determining that the first word is associated with a first label corresponding to a first label type;
determining that the third word is associated with a second label corresponding to the first label type; and
determining that the third word is to replace the first word based at least in part on the first label and the second label both corresponding to the first label type.

9. The method of claim 5, further comprising:
determining a device identifier associated with the first device;
determining that the device identifier is associated with a first geographic location;
determining that the third word corresponds to the first geographic location;
determining that the first word corresponds to a second geographic location; and
determining that the third word is to replace the first word based at least in part on the third word corresponding to the first geographic location and the first word corresponding to the second geographic location.

10. The method of claim 5, further comprising:
determining a user identifier associated with the first data;
determining previously received questions associated with the user identifier;
determining that at least a threshold number of the previously received questions relate to a first geographic location;
determining that the third word corresponds to the first geographic location;
determining that the first word corresponds to a second geographic location; and
determining that the third word is to replace the first word based at least in part on the third word corresponding to the first geographic location and the first word corresponding to the second geographic location.

11. The method of claim 5, wherein the first plurality of words includes a fourth word and wherein the method further comprises:
determining a fifth word associated with the fourth word, wherein the second question additionally includes the fifth word instead of the fourth word.

12. The method of claim 5, wherein the first plurality of words includes a fourth word and wherein the method further comprises:
determining, a fifth word associated with the fourth word;
determining a third question including the fifth word instead of the fourth word;
performing a third query of the at least one knowledge base for third information responsive to the third question;
obtaining, from the at least one knowledge base, the third information;
determining a first confidence value for the second information, the first confidence value representing a first likelihood that the second information represents an accurate response to the second question;
determining a second confidence value for the third information, the second confidence value representing a second likelihood that the third information represents an accurate response to the third question; and
determining that the first confidence value is greater than the second confidence value,
wherein causing the first device to output the representation of the second information is based at least in part on the first confidence value being greater than the second confidence value.

13. A computing system, comprising:
at least one processor; and
at least one non-transitory computer-readable medium encoded with instructions that, when executed by the at least one processor, cause the computing system to:
determine first data representing a user input;
determine that the first data corresponds to a first question including a first plurality of words, the first plurality of words including a first word corresponding to a first entity and a second word corresponding to a first attribute;
perform a first query of at least one knowledge base for first information responsive to the first question, wherein the at least one knowledge base stores information regarding associations between entities and attributes, and the computing system performs the first query at least in part by querying the at least one knowledge base for at least one of an entity or an attribute that is associated with the first entity and the first attribute;
determine, based at least in part on a result of the first query, that the computing system is unable to determine the first information using the result of the first query; and
based at least in part on the computing system being unable to determine the first information:
determine a third word associated with the second word, the third word corresponding to a second attribute,
determine a second question including the third word instead of the second word,
perform a second query of the at least one knowledge base for second information responsive to the second question, wherein the computing system performs the second query at least in part by querying the at least one knowledge base for at least one of an entity or an attribute that is associated with the first entity and the second attribute,
obtain, from the at least one knowledge base, second information that is responsive to the second question, and
cause a first device to output a representation of the second information.

14. The computing system of claim 13, wherein the at least one non-transitory computer-readable medium is further encoded with additional instructions that, when executed by the at least one processor, further cause the computing system to:

determine that the first data corresponds to a third question including a second plurality of words;

determine a first confidence value for the first question;

determine a second confidence value for the third question;

determine that the first confidence value is greater than the second confidence value; and based at least in part on the first confidence value being greater than the second confidence value, determine to perform the first query the at least one knowledge base for the first information.

15. The computing system of claim 13, wherein the at least one non-transitory computer-readable medium is further encoded with additional instructions that, when executed by the at least one processor, further cause the computing system to:

determine a plurality of content, associated with a plurality of content sources, representing the second word;

determine that the third word is represented in the plurality of content at least a threshold number of times; and based at least in part on the third word being represented in the plurality of content at least the threshold number of times, associate the third word and the second word in the at least one knowledge base.

16. The computing system of claim 13, wherein the at least one non-transitory computer-readable medium is further encoded with additional instructions that, when executed by the at least one processor, further cause the computing system to:

determine a user identifier associated with the first data;

determine that user profile data, associated with the user identifier, represents a preference indicating the second word is to be replaced with a word associated with a same label type;

determine that the second word is associated with a first label corresponding to a first label type;

determine that the third word is associated with a second label corresponding to the first label type; and determine that the third word is to replace the second word based at least in part on the first label and the second label both corresponding to the first label type.

17. The computing system of claim 13, wherein the first plurality of words includes a fourth word and wherein the at least one non-transitory computer-readable medium is further encoded with additional instructions that, when executed by the at least one processor, further cause the computing system to:

determine a fifth word associated with the fourth word, wherein the second question additionally includes the fifth word instead of the fourth word.

18. The computing system of claim 13, wherein the first plurality of words includes a fourth word and wherein the at least one non-transitory computer-readable medium is further encoded with additional instructions that, when executed by the at least one processor, further cause the computing system to:

determine a fifth word associated with the fourth word;

determine a third question including the fifth word instead of the fourth word;

perform a first query of the at least one knowledge base for third information responsive to the third question;

obtain, from the at least one knowledge base, the third information;

determine a first confidence value for the second information, the first confidence value representing a first likelihood that the second information represents an accurate response to the second question;

determine a second confidence value for the third information, the second confidence value representing a second likelihood that the third information represents an accurate response to the third question;

determine that the first confidence value is greater than the second confidence value; and cause the first device to output the representation of the second information based at least in part on the first confidence value being greater than the second confidence value.

* * * * *